United States Patent [19]

Krueger et al.

[11] Patent Number: 4,798,887
[45] Date of Patent: Jan. 17, 1989

[54] AZO DYES OF METHYLANILINE DISULFONIC ACID COUPLED WITH NAPHTHYLAMINE SULFONIC ACID

[75] Inventors: Heinz Krueger, Limburgerhof; Hartmut Lardon, Ludwigshafen; Manfred Patsch, Wachenheim, all of Fed. Rep. of Germany

[73] Assignee: BASF Aktiengesellschaft, Rheinland-Pfalz, Fed. Rep. of Germany

[21] Appl. No.: 857,051

[22] Filed: Apr. 29, 1986

[30] Foreign Application Priority Data

May 14, 1985 [DE] Fed. Rep. of Germany ....... 3517366

[51] Int. Cl.[4] .................. C09B 62/09; C09B 62/513; D06P 1/382; D06P 3/66
[52] U.S. Cl. .................................. 534/637; 534/598; 534/617; 534/642
[58] Field of Search ........................ 534/637, 642, 617

[56] References Cited

U.S. PATENT DOCUMENTS

| | | | |
|---|---|---|---|
| 3,340,247 | 9/1967 | Riat et al. | 534/637 |
| 3,950,128 | 4/1976 | Gregory | 534/637 X |
| 4,089,895 | 5/1978 | Jager | 534/637 X |
| 4,338,092 | 7/1982 | Schneider | 534/637 X |
| 4,551,150 | 11/1985 | Otake et al. | 534/637 X |

FOREIGN PATENT DOCUMENTS

| | | | |
|---|---|---|---|
| 0042108 | 12/1981 | European Pat. Off. | 534/637 |
| 0115626 | 8/1984 | European Pat. Off. | 534/637 |
| 0167858 | 1/1986 | European Pat. Off. | 534/637 |
| 60-58264 | 8/1985 | Japan | 534/637 |
| 60-217269 | 10/1985 | Japan | 534/637 |
| 367585 | 4/1963 | Switzerland | 534/637 |
| 481994 | 1/1970 | Switzerland | 534/637 |
| 997639 | 7/1965 | United Kingdom | 534/637 |
| 1102204 | 2/1968 | United Kingdom | 534/637 |
| 2160883 | 1/1986 | United Kingdom | 534/637 |

OTHER PUBLICATIONS

Jarkovsky et al., Chemical Abstracts, vol. 95, 8801p (1981).
Sumitomo, II, Chemical Abstracts, vol. 101, 132453p (1984).

Primary Examiner—Floyd D. Higel
Attorney, Agent, or Firm—Oblon, Fisher, Spivak, McClelland & Maier

[57] ABSTRACT

Novel compounds which, in the form of the free acid, are of the formula 1

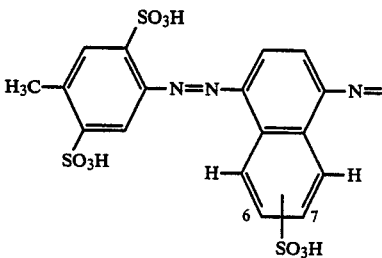

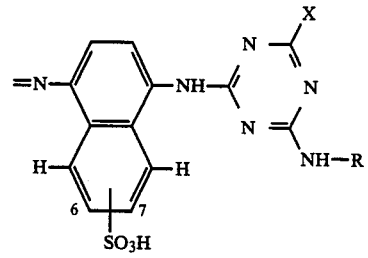

where X is chlorine or fluorine and R is hydrogen, vinylsulfonylphenyl, β-sulfatoethylsulfonylphenyl, vinylsulfonylbenzyl, sulfophenyl or β-sulfatoethylsulfonylbenzyl, are particularly suitable for dyeing cotton.

1 Claim, No Drawings

AZO DYES OF METHYLANILINE DISULFONIC ACID COUPLED WITH NAPHTHYLAMINE SULFONIC ACID

The present invention relates to compounds which, in the form of the free acid, are of the formula I

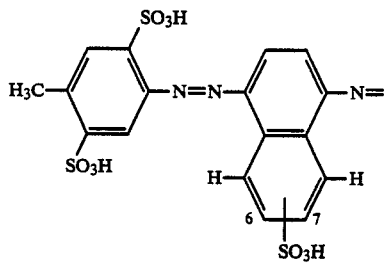

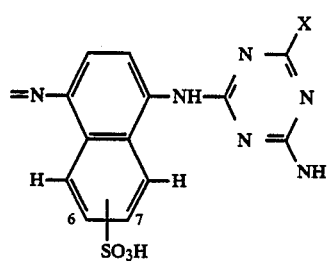

where X is chlorine or fluorine and R is hydrogen, vinylsulfonylphenyl, β-sulfatoethylsulfonylphenyl, vinylsulfonylbenzyl, sulfophenyl or β-sulfatoethylsulfonylbenzyl.

The dyes can be prepared in a conventional manner and details are given in the Examples in which parts and percentages are by weight, unless stated otherwise.

The compounds of the formula I are useful for dyeing hydroxyl-containing fibers, preferably cotton, particularly by the exhaustion method. Deep reddish brown dyeings having good fastness properties are obtained, Compared with the dye disclosed in Swiss Patent No. 471,870, the novel compounds surprisingly possess greater color strength and give a desirable reddish brown hue, as well as having better light fastness.

Compared with similar dyes without a methyl group, the novel compounds exhibit a greatly increased color strength.

The novel compound in which X is Cl and the sulfo groups are in the 6-position of the naphthalene radicals is particularly important.

EXAMPLE 1

26.7 parts of the product obtained by diazotizing 4-methylaniline-2,6-disulfonic acid in an aqueous solution containing hydrochloric acid are coupled to 22.3 parts of naphthylamine-6-sulfonic acid, coupling being carried out with 7.5 parts of sodium bicarbonate, initially at pH 2-3 and then at pH 5. When free diazo compound is no longer detectable, diazotization is effected with 33 parts of 23% strength sodium nitrite solution and 27.4 parts of a 20% strength hydrochloric acid in the course of 30 minutes at 10°–15° C. Excess nitrite is destroyed with sulfamic acid, after which 22 parts of naphthylamine-6-sulfonic acid are added. By slowly sprinkling in a total of 8 parts of sodium bicarbonate, coupling is terminated at pH 4. The resulting disazoamino dye is reacted with a suspension of 19.5 parts of cyanuric chloride in 190 parts of ice water at pH 6 until free amino groups are no longer detectable. During this reaction, 2 parts of trisodium phosphate and 50 parts of 10% strength sodium hydroxide solution are required to maintain a constant pH.

Excess cyanuric chloride is then filtered off, and the dye solution is reacted with 27.2 parts of 25% strength ammonia for 2 hours at 40° C. The dye is isolated by salting out with potassium chloride, and is of the formula

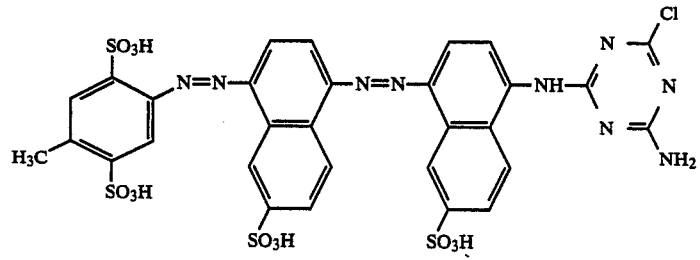

It dyes cotton in fast reddish brown hues.

EXAMPLE 2

If 29 parts of 25% strength ammonia as in Example 1, and the reaction conditions are altered to pH 6–7 and 30°–40° C., a dye of the formula

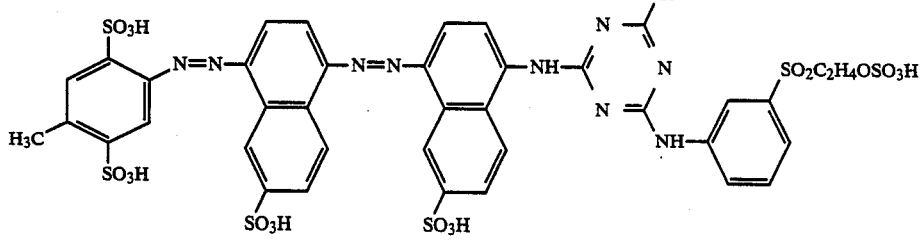

is obtained. It dyes cotton in fast reddish brown hues.

and the dye which is not fixed can be readily washed out.

Other brown dyes having good properties are listed in the Table below, the coupling components used being listed in columns I and II, and the amine radical bonded to the triazine anchor being listed in column III.

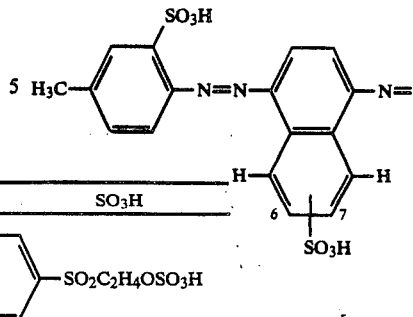

(I)

| Example | I | II | III |
|---|---|---|---|
| 3 | 1-aminonaphthalene-6-sulfonic acid | 1-aminonaphthalene-6-sulfonic acid | —NHCH₂—⟨C₆H₄⟩—SO₂C₂H₄OSO₃H |
| 4 | 1-aminonaphthalene-6-sulfonic acid | 1-aminonaphthalene-6-sulfonic acid | —NH—⟨C₆H₄⟩—SO₃H |
| 5 | 1-aminonaphthalene-6-sulfonic acid | 1-aminonaphthalene-6-sulfonic acid | —NH—⟨C₆H₄⟩—SO₂C₂H₄OSO₃H |
| 6 | 1-aminonaphthalene-7-sulfonic acid | 1-aminonaphthalene-6-sulfonic acid | —NH—⟨C₆H₄⟩—SO₂C₂H₄OSO₃H (meta) |
| 7 | 1-aminonaphthalene-6-sulfonic acid | 1-aminonaphthalene-6-sulfonic acid | —NH—⟨C₆H₃(SO₃H)₂⟩ |

We claim:

1. A compound which, in the form of the free acid, is of the formula (I):

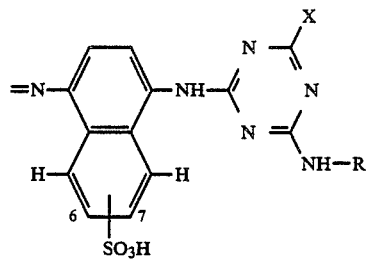

wherein X is chlorine; and R is hydrogen, vinylsulfonylphenyl, β-sulfatoethylsulfonylphenyl, vinylsulfonylbenzyl, sulfophenyl or β-sulfatoethylsulfonylbenzyl, and wherein the sulfo groups are in the 6-position of the naphthalene radicals.

* * * * *